United States Patent
Tapson

(10) Patent No.: US 7,352,914 B2
(45) Date of Patent: *Apr. 1, 2008

(54) DATA PROCESSING APPARATUS

(75) Inventor: Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 983 days.

This patent is subject to a terminal disclaimer.

(21) Appl. No.: 10/223,340

(22) Filed: Aug. 19, 2002

(65) Prior Publication Data

US 2003/0063674 A1    Apr. 3, 2003

(30) Foreign Application Priority Data

Aug. 21, 2001  (GB) ................... 0120331.4

(51) Int. Cl.
*G06K 9/40* (2006.01)
*G09G 5/00* (2006.01)

(52) U.S. Cl. ..................... 382/275; 345/647

(58) Field of Classification Search ............... 382/100, 382/248, 260–265, 275, 276, 232–233; 345/611, 345/647–648; 348/241–252, 606–624; 358/3.26
See application file for complete search history.

(56) References Cited

U.S. PATENT DOCUMENTS

| | | | |
|---|---|---|---|
| 5,353,117 A | 10/1994 | Holman et al. | 348/183 |
| 5,557,417 A | 9/1996 | Ishii | 386/93 |
| 5,574,499 A | 11/1996 | Nasu | 348/180 |
| 5,909,520 A * | 6/1999 | Garcia | 382/303 |
| 6,665,335 B1* | 12/2003 | Rajagopal et al. | 375/224 |
| 6,714,683 B1* | 3/2004 | Tian et al. | 382/240 |
| 6,910,011 B1* | 6/2005 | Zakarauskas | 704/233 |
| 6,985,632 B2* | 1/2006 | Sato et al. | 382/240 |
| 7,002,603 B2* | 2/2006 | Tapson | 345/647 |

FOREIGN PATENT DOCUMENTS

EP    1 098 522 A1    5/2001

OTHER PUBLICATIONS

J. Pelly, et al., "UMID Watermarking for Managing Metadata in Content Production", SMPTE Journal, vol. 110, No. 7, XP-008035229, pp. 429-435.
Joseph J. K. O Ruanaidh, et al., "Rotation, Scale and Translation Invariant Digital Image Watermarking", Image Processing, XP-010254226, Oct. 26, 1997, pp. 536-539.
D. Tapson, "Image Watermark Robust to Geometric Distortions", Sony Research Forum, XP-002384556, pp. 1-2.

* cited by examiner

*Primary Examiner*—Kanjibhai Patel
(74) *Attorney, Agent, or Firm*—Oblon, Spivak, McClelland, Maier & Neustadt, P.C.

(57) ABSTRACT

A data processing apparatus is provided for detecting distortion of a data signal to which a template signal has been introduced into different frequency bands of the signal. The apparatus includes a frequency component processor operable to generate data representative of the frequency components of the first and the second frequency bands of the data signal, and a detection processor operable to identify the distortion of the data signal in accordance with a relative frequency change between the versions of the recovered template signal.

37 Claims, 6 Drawing Sheets

DATA PROCESSING APPARATUS

FIELD OF INVENTION

The present invention relates to data processing apparatus and methods for detecting distortion of data signals. The present invention also relates to data processing apparatus and methods operable to correct for distortion of data signals.

In some embodiments the data signal is an image.

Aspects of the present invention also relate to an image processing apparatus and methods operable to detect and recover data, which has been embedded in an image, from a distorted version of the image.

BACKGROUND OF INVENTION

Data signals may be distorted by any process performed on the data signals. For example, if a data signal is recorded or communicated, the signal may be distorted by processes performed in order to communicate or record the data signal. In addition, unwanted disturbances, caused by natural phenomena such as noise, fading or interference, may introduce distortion to the data signal.

SUMMARY OF INVENTION

An object of the present invention is to provide a data processing apparatus and method for detecting and/or correcting or at least reducing the effects of distortion applied to data signals.

It is also an object of the present invention to provide an image processing apparatus operable to detect and recover data, which has been embedded in an image, from a distorted version of that image.

According to an aspect of the present invention there is provided a data processing apparatus operable to combine at least first and second template signals into first and second frequency bands respectively of a data signal, the template signals having a predetermined relationship with one another and being combined in the first and second bands with the effect that distortion of the data signal produces a relative change in frequency between the first and the second template signals.

The term frequency band refers to a range of frequencies forming part of a total range of frequencies from which a data signal is comprised.

According to another aspect of the present invention there is provided a data processing apparatus for detecting distortion of a data signal to which a template signal has been introduced into at least first and second frequency bands of the data signal, each of the template signals introduced into the first and second frequency bands having a predetermined relationship with each other. The apparatus comprises a detection processor operable to identify the distortion of the data signal from a relative frequency change between versions of the template signal recovered from the first and second frequency bands.

It has been observed that by introducing a template signal into different frequency bands of a data signal, distortion, which the data signal experiences, can be identified from a relative change of frequency of the template signal between each of the different frequency bands. In some embodiments, the template signal introduced into each of the different bands may be the same. The template signal in some embodiments may be a pseudo random noise signal. In other embodiments, the template signal in one of the plurality of bands may be formed from a version of components of the data signal from another of the frequency bands. Accordingly the template signals are arranged to have a predetermined relationship with one another, such that by comparing the frequency components of the template signals, recovered from the frequency bands, a relative frequency change between the components of the template signals can be determined, which is indicative of distortion experienced by the data signals.

The term template signal as used herein is provided in order to distinguish the (template) signal used to identify distortion from the data signal with respect to which distortion is to be determined. The term "template" is therefore used to provide a reference, guide or training effect and any of these terms or other terms may be used as a substitute for "template".

Preferably in order to recover the template signal from the bands, a frequency component processor is operable to transform the data signal into a transform domain in which the frequency components of the data signal are provided. In the transform domain, the frequency component processor may be arranged to generate data representative of the frequency components of the first and the second frequency bands of the data signal. In preferred embodiments, the transform is the discrete Wavelet transform, the frequency bands being provided as Wavelet bands.

In order to determine the relative change of frequency in the template signal, advantageously, the detection processor may be operable to generate data representing versions of the template signal recovered from the first and the second frequency bands. The samples of each of the recovered versions of the template signal, from the first frequency band, are multiplied with corresponding samples of the template signal from the second frequency band to produce product signal samples. The product signal samples are then transformed into the frequency domain, and the relative change in frequency of the template signal in each of the bands is determined from at least one sample of the frequency domain product samples having a larger amplitude than the others. As will be explained, a computationally efficient technique for evaluating the relative change of frequency of the template signal is thereby provided.

Preferably, once the distortion has been identified, the detection processor may be operable to generate data representative of the identified distortion. For the example of two-dimensional signals, the signal may include vertical and horizontal frequency components. In this case, the different frequency bands comprise different band combinations of the horizontal and vertical frequency components. For a two dimensional signal, the transform performed by the detection processor in order to recover the template signal, and in order to introduce the template signal is the two dimensional Wavelet transform.

According to another aspect of the present invention there is provided a data processing apparatus for detecting distortion of a data signal to which a template signal has been introduced into first and second frequency bands of the signal. The data processing apparatus comprises a detection processor operable to identify the distortion of the data signal in accordance with a relative frequency change between versions of the template signal recovered from the first and second frequency bands and to generate data representative of the identified distortion. An inversion processor is operable to receive the data representative of the distortion and the data signal and to reverse the distortion.

By identifying the distortion and generating data representative of the distortion, the distortion may be removed from the data signal by an inversion processor. For example, if the distortion is approximated to a transform applied to the data signal, transform parameters corresponding to the distortion can be evaluated in terms of the transform. An inversion processor can therefore be used to apply an inverse transform according to the evaluated transform parameters.

As disclosed in [1], data may be embedded in material such as, for example, video material. This embedded data may be meta data, which identifies the content of the material. In another example the embedded data may be a unique or substantially unique identifier, which can be used to identify the material, providing the owner with a facility for asserting intellectual property rights in the material.

An example application for embodiments of the invention is to facilitate recovery of data, which has been embedded in material. For example, if the material is video material which has been distorted in some way, the distortion may have an effect of reducing the likelihood of correctly recovering the embedded data. For example, it is known that pirate copies of films can be produced by a person recording the film using a video camera in a cinema at which the film is being shown. The effect of recording the film using a video camera can distort the recorded film in accordance with a relative perspective view of the cinema screen from the camera. The distortion can have an effect of reducing the likelihood of correctly recovering the embedded data thereby preventing the owner from, for example, proving ownership and enforcing intellectual property rights in the film.

According to another aspect of the present invention there is provided an image processing apparatus operable to receive image data representative of an image to which a template signal has been introduced into different frequency bands of the image and to reverse the distortion applied to the image. The image processing apparatus includes a detection processor operable to generate data representative of parameters of a transform applied to the image. The transform is therefore representative of an approximation of the distortion applied to the image. An inverse transform processor is operable to invert the transform representative of the distortion applied to the image in accordance with the parameters.

In some embodiments, the transform, which is considered to represent the distortion applied to the image, is a linear transform such as the Affine transform, the parameter data representing at least four parameters. The Affine transform is described in [2].

In preferred embodiments the template signal is introduced into the image by applying the Wavelet transform to the image, and introducing the template signal into at least one of the Wavelet bands. Correspondingly, a frequency processor of the data processing apparatus is operable to perform the Wavelet transform on the received image in order to recover the template signal.

Various further aspects and features of the present invention are defined in the appended claims.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Embodiments of the present invention can provide a facility for detecting an amount of distortion to any data-bearing signal. Embodiments of the present invention can also be arranged to correct for such distortion.

In order to illustrate the advantages provided by embodiments of the present invention, an example embodiment will be described with reference to detecting distortion of an image and for correcting for this distortion. A particular application of embodiments of the present invention is in the field of watermarking in which data is embedded into material in order, for example, to detect and/or protect ownership of the material.

Figure 1:
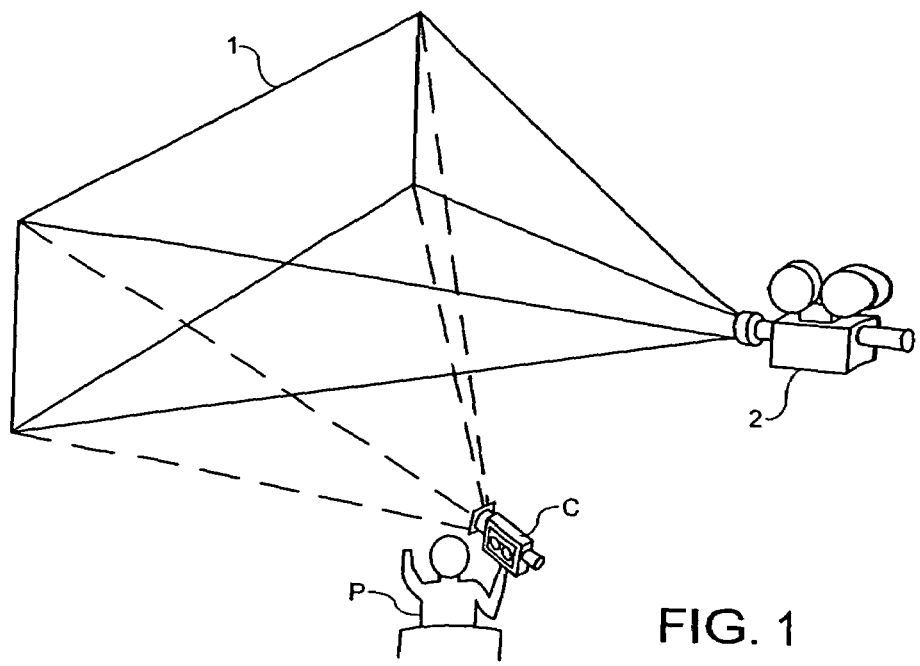
FIG. 1 is a diagram representing a cinema in which pirate copies of films are being created, by recording the film displayed in the cinema using a video camera.

It is known that pirate copies of films and video material are sometimes generated by recording the film or video material using a video camera or camcorder. As illustrated in FIG. 1, a pirate may enter a cinema and record a film, which is projected onto a screen 1 from a cinemagraphic projector 2. Typically, however, the pirate P will be sitting at an angle to the screen so that the image I' recorded by the video camera C will be distorted with respect to the original image I.

Viewing and recording an image I at an angle can result in distortion of the image I when the recorded image I' is reproduced. In many imaging systems, detected images I' may be subjected to distortion, as a result of the position of a camera capturing the images I with respect to the scene. The position of the camera can have an effect of altering the apparent dimensions of the scene geometry. This can be represented as perspective irregularities being introduced into the image.

Generally, distortion can be represented as an Affine transform [2], which has four parameters. As such, by determining the parameters of the distortion in terms of either an Affine transform, a distorted image can be corrected for a range of Affine distortion by reversing the transform of the image in accordance with the determined parameters.

One embodiment of the present invention provides a facility for detecting the degree of Affine transform from the image itself. Accordingly, the Affine transform can be corrected. As a result, data, which may have been embedded in an image, may be more likely to be correctly recovered.

In order to detect and determine an amount of Affine distortion applied to an image, embodiments of the present invention are arranged to introduce a predetermined template signal into different frequency bands of a data signal with respect to which the distortion is to be detected. In some embodiments the predetermined template signal may be different in each band, although the template signals are arranged to have a predetermined relationship with each other. As explained, the predetermined relationship is such that a relative frequency change between frequency components of the template signal can be detected.

One Dimensional Data Signal

Figure 2:
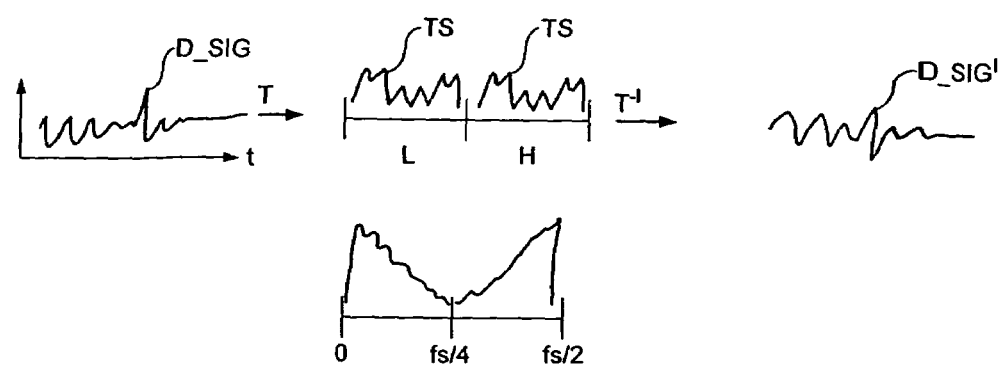
FIG. 2 provides an illustrative representation of the effect of distortion on a template signal introduced into different frequency bands of a data signal.

An example, of a data signal in which distortion may be detected and corrected by an embodiment of the present invention is represented in FIG. 2, as a plot of amplitude with respect to time. The data signal may represent, for example, an audio signal, which is transformed by an appropriate transform into a transform domain in which high H and low L frequency bands are distinguished and represented separately. For example, a convenient transform is the Wavelet transform or for a disctrete time digitally sampled version of the data signal, the Discrete Wavelet Transform (DWT). Thus, as a result of the Wavelet transform, the high and low H, L bands are provided in the transform domain.

In the Wavelet transform domain, a template signal TS is added to each of the bands. In preferred embodiments, the template signal is a pseudo-random noise signal, which may be generated from a Pseudo-Random Bit Sequence (PRBS). The Wavelet transform domain signal to which the template signal TS has been introduced into different Wavelet bands is then inverse transformed $T^{-1}$ into the time domain. The template signal may be introduced into the Wavelet transform domain signal by embedding the template signal as explained in [1] and briefly at the end of the description of specific embodiments of the invention.

Using a pseudo-random noise signal as the template signal has an advantage that the effect of adding the template signal in the time domain prevents or at least reduces the likelihood of the template signal being detected. For example, if the data signal is an audio signal, then the effect of adding a pseudo-noise signal will be less likely to be perceivable to a person listening to the audio signal, than a non noise-like signal.

The present invention utilises a phenomenon that distortion of the data bearing signal has an effect of changing differently the relative frequency of the template signal in each of the bands to which the signal has been added. Thus, by identifying the difference in the frequency components at respective frequencies of the template signal after the data bearing signal has been distorted, an indication is provided of the relative distortion.

Figure 3:
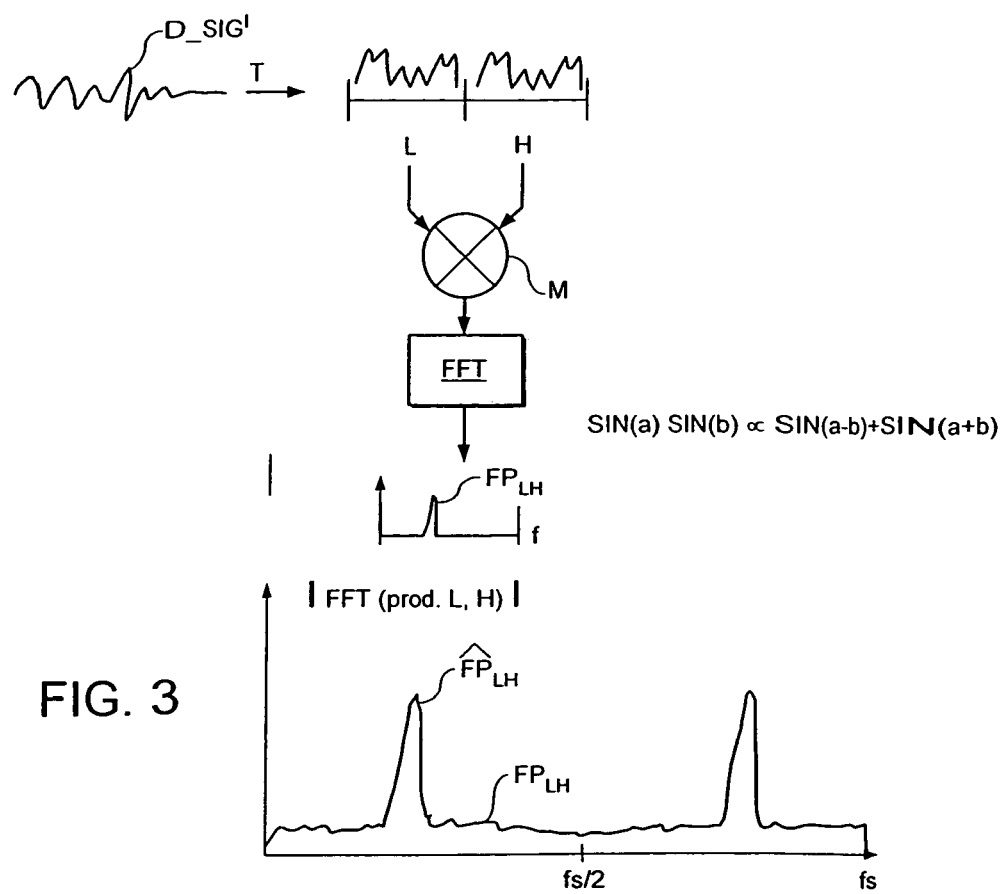
FIG. 3 is a graphical representation of the magnitude of frequency domain samples produced by transforming the product of the template signal samples from different frequency bands into the frequency domain.

For the one dimensional data bearing signal D_SIG', shown in FIG. 2, a general description of the distortion detecting process is illustrated in FIG. 3. In FIG. 3, the data signal D_SIG' is again transformed into the Wavelet transform domain in which the template signal in the high H and low L bands may be detected and recovered. In order to determine the distortion applied to the data signal D_SIG', the difference between the respective frequency components of the template signal is determined.

An efficient way of detecting the difference is to multiply respective samples of the template signal from each of the bands and to transform the product samples produced into the frequency domain. This is illustrated in FIG. 3 by a multiplier M which is arranged to multiply respectively the signal samples from the template signal from each respective band, and to form Fast Fourier Transform (FFT) of the resulting product signals.

It is observed that, in the well known relationship, sin A sin B is proportional to sin(A−B)+sin(A+B). Thus, by forming the product of the template signal in the time domain and transforming this into the frequency domain, a signal with a component proportional to the difference frequency is provided. Accordingly, an output signal $FP_{L,H}$ formed at the output of the FFT is illustrated in FIG. 3. The signal sample of the output signal with the highest magnitude $\hat{FP}_{L,H}$ in the frequency domain provides an indication of the relative distortion experienced by the data signal.

Two Dimensional Data Signal

Figure 4:
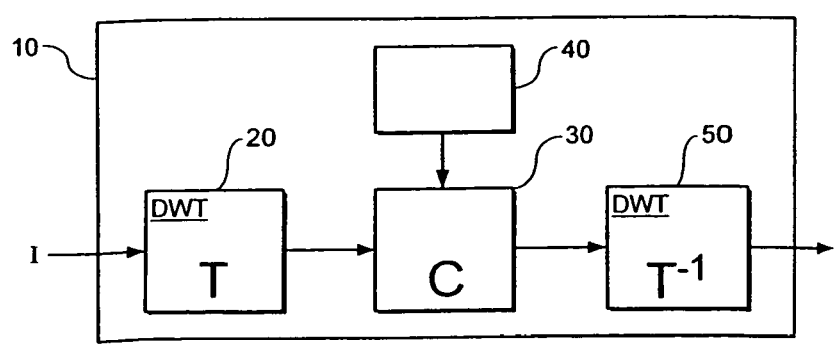
FIG. 4 is a schematic block diagram of a data processing apparatus operable to introduce a template signal into different frequency bands of a data signal.
Figure 5:
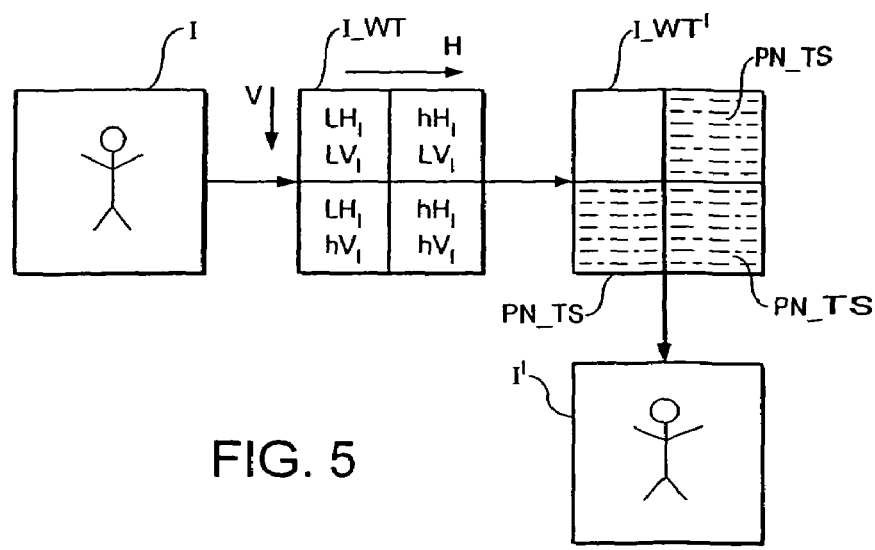
FIG. 5 is a representation of the effect of operations on an image performed by the data processing apparatus shown in FIG. 4.

For a two-dimensional signal, such as an image, a data processor for embedding a template signal into a two-dimensional image is shown in FIG. 4. Correspondingly, the effect of each of the components of the data processor shown in FIG. 4 is illustrated in FIG. 5.

In FIG. 4, a data processor 10 receives a signal representing an image I. The image I is received by a transform processor 20. The transform processor 20 operates to perform a Discrete Wavelet Transform on the image I to produce a level one Wavelet transformed image I_WT comprising four bands defined with respect to vertical and horizontal frequencies V, H (FIG. 5). The transform processor 20 produces a first order Wavelet transform comprising the four bands $lH_1\ lV_1$, $hH_1\ lV1$, $lH_1\ hV_1$, $hH_1\ hV_1$. The discrete Wavelet transformed image is fed to a combiner 30. The combiner 30 is also arranged to receive a pseudo-random noise signal from a pseudo-random noise generator 40. The pseudo-random noise signal generated by the generator 40 is produced from a Pseudo Random Bit Sequence (PRBS). Although the PRBS produces a signal with noise like qualities, the signal is predetermined and is therefore predictable at the receiver. For the present example embodiment, the pseudo-random noise signal forms a template signal PN_TS. The combiner 30 combines the pseudo-random noise template signal into three of the bands $hH_1\ lV_1$, $lH_1\ hV_1$, $hH_1\ hV_1$, of the Wavelet transformed image I_WT to form as shown in FIG. 5 a version of the Wavelet transform image I_WT' including the pseudo-noise template signal PN_TS. An inverse transform processor 50 is arranged to receive the Wavelet transformed image I_WT' to perform an inverse Wavelet transform to recover a version of the image I' to which the template signal has been introduced into the three bands.

The template signals are introduced into each band by adding or subtracting a factor α to a corresponding Wavelet coefficient in the band, depending on the sign of a corresponding bit in the template data signal. A brief explanation of how data may be embedded in data signals such as video material is provided at the end of this description.

As already indicated for the one dimensional case, the use of a pseudo-random noise signal as a template signal has an effect of reducing the likelihood that the presence of the template signal will be detected from the processed image I'.

For the present example embodiment, the pseudo-random noise signal is not added to the horizontal low vertical $lH_1 lV_1$ frequencies band. This is because this band contains the low frequency components of the image. The low frequency components of the image are more visually perceptible than the high frequency components of the image. As such, the addition of noise into this band $lH_1 lV_1$ would be more noticeable in the time domain version of the image I'.

Alias and Wavelets

A mathematical analysis illustrating that distortion of a data signal can be detected by estimating an amount of relative frequency shift of a template signal added to different bands is provided in the following paragraphs.

For the one-dimensional example consider the following cosine wave of frequency $f_1$ and phase p, defined for discrete samples $S_x$ with sampling frequency $f_s$.

$$S_x = \exp(kf_1 x + ip) + \exp(-(kf_1 x + ip)) \quad k = i2\eth/f_s.$$

It is well known that $$\exp(ix) = \exp(i(x + 2\eth))$$

and hence that $$S_x = \exp(xkf_2 + ip) + \exp(-(xkf_2 + ip))$$

where $$f_2 = f_1 + sf_s \text{ for all integer s}$$

The values of $f_2$ are the alias frequencies of $f_1$, which are different frequencies that when discretely sampled at $f_S$ yield the same values as $f_1$. For all $f_1$ there exists at most one unique alias frequency $f_2$ such that $$|f_2| < |f_s/2|$$

Two Dimensional Wavelet Frequency Analysis

In two dimensions when using a rectangular sampling grid, a general frequency may be represented by, $$S_{xy} = \exp(k_x f_{x1} x + k_y f_{y1} y + ip) + \exp(-(k_x f_{x1} x + k_y f_{y1} y + ip))$$

$$k_x = 2i\eth/f_{sx}, k_y = 2i\eth/f_{sy}.$$

Correspondingly therefore, two dimensional frequencies have a two dimensional family of alias frequencies, $$f_{2x} = f_{1x} + sf_{sx}, f_{sy} = f_{1y} + tf_y \text{ for all integers s,t}$$

again there is at most one unique pair $f_{2x}, f_{2y}$ such that $$|f_{2x}| < f_{sx}/2 \text{ and } |f_{2y}| < f_{sy}/2$$

In two dimensions it is important to keep track of the signs of the x and y frequency components, as changing the sign of one will reflect the frequency.

An explanation of the operation of the data processor according to the example embodiment of the present invention is provided as follows:

As already indicated above, the first level Wavelet transform of a one-dimensional signal consists of two bands H and L. The low band L is generated, for example, by low pass filtering the input signal at $f_s/4$ and then sub-sampling by a factor of two. The high pass band H is generated for example by high pass filtering and then sub-sampling by two.

Consider the action of the low band Wavelet filter on a frequency f with phase p, in the image such that $|f| < f_s/4$.

$$S_x = \exp(kfx + p) + \exp(-(kfx + p)) \text{ where } |f| < f_s/4.$$

Low pass filtering should not affect the content of the data signal. Sub-sampling by two doubles the frequency.

$$T_x = S_{2x} \text{ (subsampling by 2)}$$

$$T_x = \exp(2kfx + p) + \exp(-(2kfx + p))$$

Under the condition that $|2f| < f_s/2$ no alias is observed. So the low band of the discrete Wavelet transform maps a frequency f;

$$DWT_L(f, p) = (2f, p) \quad |f| < f_s/4$$

Now consider the action of the high pass Wavelet filter on a high frequency component of the image, $$S_x = \exp(kfx + p) + \exp(-(kfx + p)) \text{ where } f_s/4 < f < f_s/2$$

High pass filtering at $f_s/4$ should not affect this frequency. Sub-sampling by two has the effect of doubling the sampling frequency.

$$T_x = \exp(2kfx + p) + \exp(-(2kfx + p))$$

But $f_s/2 < |2f| < f_s$ hence the observed frequency will be the alias $2f - f_s$.

$$|2f - f_s| < f_s/2$$

So the high band of the discrete Wavelet transform maps a positive frequency f $$DWT_H(f, p) = (2f - f_s, p) \quad f_s/4 < f < f_s/2.$$

Similarly for negative f, $$DWT_H(f, p) = (2f + f_s, p) \quad f_s/4 < -f < f_s/2.$$

Note that a positive high band Wavelet frequency, results in a negative image frequency. For real one-dimensional signals the sign of the Wavelet frequency has no material effect. However for a two-dimensional signal, the sign of the horizontal or vertical frequency component will "reflect" the wave.

From the above relationships, analogous functions for the inverse Wavelet transform can be formed, $$IDWT_L(f, p) = (f/2, p) \quad |f| < f_s/4$$
$$IDWT_H(f, p) = ((f - f_s)/2, p) \quad f_s/4 < f < f_s/2$$
$$\quad\quad\quad\quad\quad\quad ((f + f_s)/2, p) \quad f_s/4 < -f < f_s/2$$

For the example embodiment illustrated in FIGS. 4 and 5, the two dimensional discrete Wavelet transform produced by the transform processor 20 may be achieved by the application of the one dimensional transform to the rows of pixels, and then to the resulting columns of pixels. This produces the four bands labelled bands $lH_1 lV_1$, $hH_1 lV_1$, $lH_1 hV_1$, $hH_1 hV_1$ shown in FIG. 5.

Applying the above functions to an data signal such as to an image having two dimensional frequency components, a two dimensional discrete Wavelet transform is provided, which may be represented by the following equations:

$$S_{nm} = \exp(k_x f_x n + k_y f_y m + p) + \exp(-(k_x f_x n + k_y f_y m + p))$$

$$DWT_{LL}(f_x, f_y, p) = (DWT_L(f_x), DWT_L(f_y), p)$$

$$DWT_{HL}(f_x, f_y, p) = (DWT_H(f_x), DWT_L(f_y), p)$$

$$DWT_{LH}(f_x, f_y, p) = (DWT_L(f_x), DWT_H(f_Y), p)$$

$$DWT_{HH}(f_x, f_y, p) = (DWT_H(f_x), DWT_H(f_Y), p)$$

The effect of forming the inverse Wavelet transform on the template signal in the Wavelet transform domain.

$$IDWT_{LL}(f_x, f_y, p) = (IDWT_L(f_x), IDWT_L(f_y), p)$$

$$IDWT_{HL}(f_x, f_y, p) = (IDWT_H(f_x), IDWT_L(f_y), p)$$

$$IDWT_{LH}(f_x, f_y, p) = (IDWT_L(f_x), IDWT_H(f_y), p)$$

$$IDWT_{HH}(f_x, f_y, p) = (IDWT_H(f_x), IDWT_H(f_y), p)$$

Detection and Inversion of an Affine Transform

As already explained, images may be distorted in a way which approximates to an Affine transform. For the present example, the image may form part of a video signal recorded by the camcorder from the film as a result of the illegal copying process illustrated in FIG. 1. In order therefore to increase the likelihood of being able to recover data embedded within an image I, produced from this recording a data processor is arranged to analyse the distorted image and to estimate parameters representing the distortion. In particular, the parameters may be representative of an Affine transformation of the image.

Figure 6:
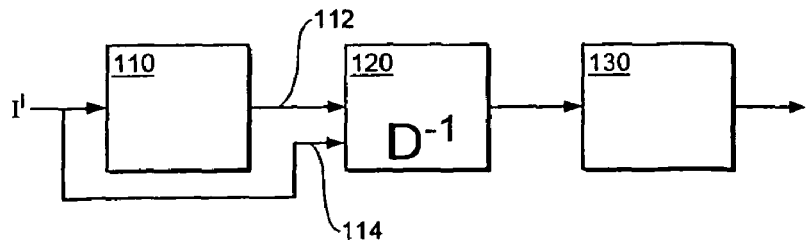
FIG. 6 is a schematic block diagram of a data processing apparatus operable to identify distortion applied to an image.

A data processor for removing the distortion and for recovering the embedded data in the image is shown in FIG. 6. In FIG. 6, the distorted image is received by a transform detection processor 110 which is operable to determine the transform parameters which represent the distortion applied to the image. The image and the transform parameters, which are determined by the transform detection processor 110, are then fed to an inverse transform processor 120, via first and second input channels 112, 114. The distortion to the image I represented by the transform parameters is removed by the inverse transform processor 120, using the transform parameters generated by the transform detection processor 110. The undistorted image recovered by the inverse transform processor 120 is then fed to a recovery processor 130.

The recovery processor 130 is arranged to recover data embedded in the image in order to identify the owner of the image. An explanation of recovering data embedded in an image is provided at the end of this description of the preferred embodiments.

The transform detection processor 110 is arranged to detect and generate parameters representative of the transform applied to the image. The transform detection processor is shown in more detail in FIG. 7 with the corresponding effect on the reproduced image represented in FIG. 8. In general, however the two-dimensional case corresponds substantially to process steps taken to detect distortion of the one-dimensional signal already explained above and with reference to FIG. 3.

Figure 7:
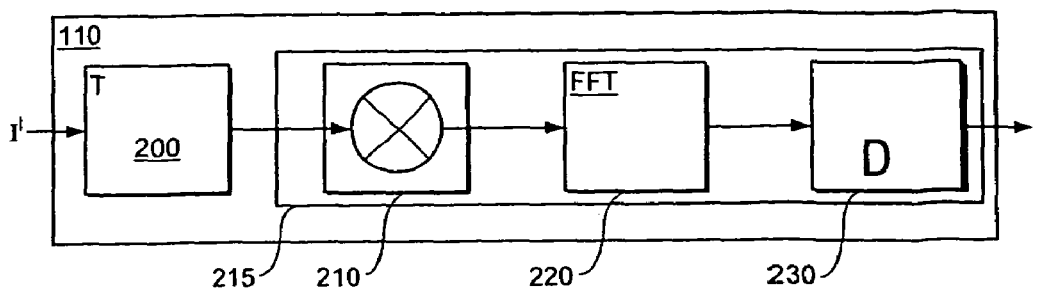
FIG. 7 is a schematic block diagram of a transform detection processor shown in FIG. 6.

In FIG. 7, the image signal may have been recovered from a recording of the original image such as for example when the camcorder is used to capture and record the images of the film as illustrated in FIG. 1. The image signal is processed to correct distortion represented as a transform applied to the image, which is representative of the view of the camcorder with respect to the display screen.

Figure 8:
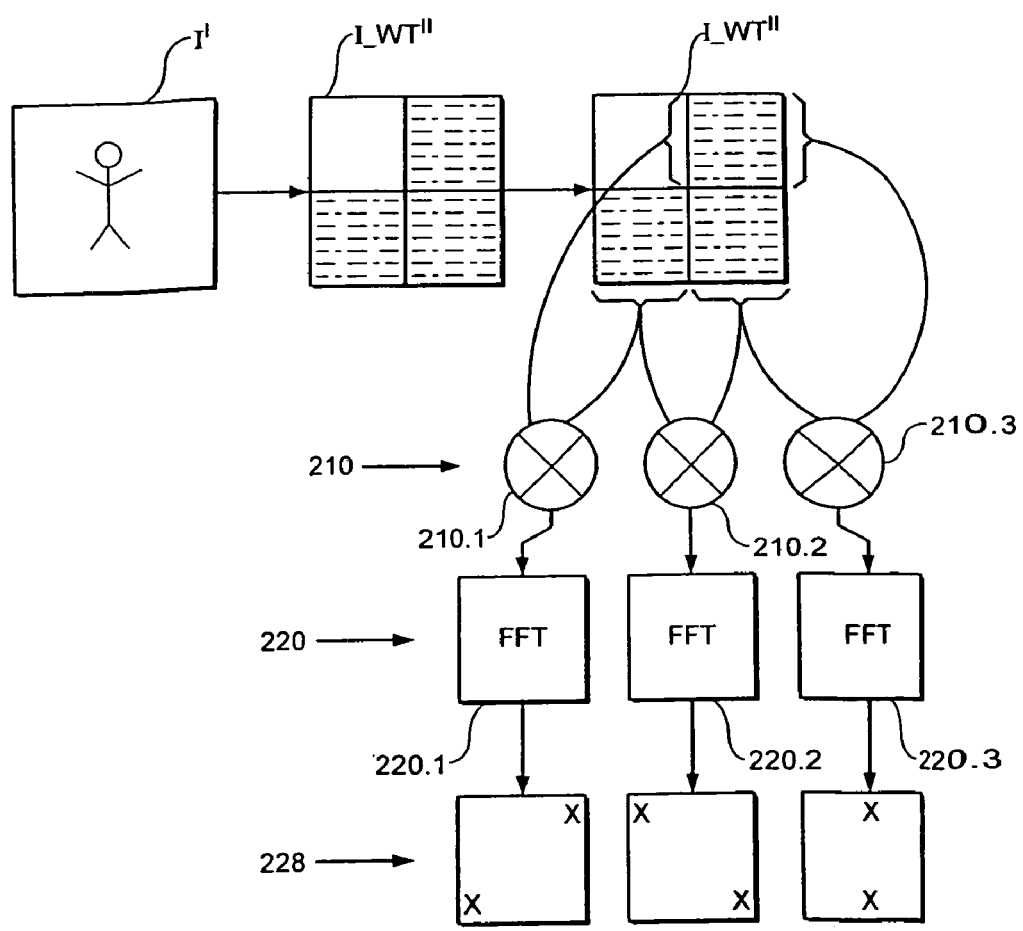
FIG. 8 is a representation of the effect of operations on an image performed by the transform detection processor shown in FIG. 7.

The image signal I' is received by a transform processor 200 within the transform detection processor 110. The transform processor 200 performs a DWT to convert the image into the Wavelet transform domain. In the present example embodiment, a level one transform is produced as is illustrated in FIG. 8. As shown in FIG. 8, the image I is converted into the Wavelet transform domain I_WT'' which corresponds to the Wavelet transform representation shown in FIG. 5. The Wavelet transform image I_WT'' is then fed from the transform processor 200 to a detection processor 215, comprising a product forming processor 210, a Fourier transform processor 220 and a transform parameter processor 230.

As explained, with reference to the one-dimensional case, the product forming processor 210 is arranged to multiply respective signal samples of the template signal present in two of the three bands of the Wavelet transform image. However, as shown in FIG. 8, since there are three bands, into which the template signal has been embedded, there are three combinations of multiplication, which can be performed between signal samples of the template signal from two of the three bands. The product forming processor 210 is represented in FIG. 8 by three multipliers having two inputs each of which is arranged to receive samples from one of the bands of the Wavelet transformed image I_WT''. Each of the multipliers 210.1, 210.2, 210.3 is therefore arranged to multiply corresponding samples from the template signal in two of the bands to which the inputs are connected. Accordingly, the three possible combinations of multiplication from the bands form the product signal samples produced by the product forming processor 210. The product signal samples are then fed to a Fourier transform processor 220. The Fourier transform processor performs a Discrete Fourier Transform to generate a frequency domain representation of the product signal samples.

The Fourier transform processor 220 is represented in FIG. 8 by three Fourier transform processors 220.1, 220.2, 220.3, each of which forms a two-dimensional Fourier transform of the vertical and horizontal product signals produced by multiplying the respective signal samples from the template signal from each of the bands.

As shown in FIG. 8, a result 228 of the Fourier transform in the frequency domain is to produce a peak at horizontal and vertical frequencies values at each of a pair of points. The pairs of points are represented as X in the two-dimensional frequency domain representation and provide an indication of horizontal and vertical frequency co-ordinates, which represent the distortion experienced by the image.

Each of the three two-dimensional frequency domain indications of the distortion is fed to a transform parameter estimator 230. The transform parameter estimator 230 can estimate the Affine transform parameters from the horizontal and vertical frequency values of the peak signal samples produced by the Fourier transform processor 220. However, in order to provide an improved estimate of the Affine transform parameters, each of the frequency co-ordinate pairs are used in combination to refine the estimate of the transform parameters.

The estimation of the two-dimensional Affine transform from the peak two-dimensional frequency signal samples values is calculated by the transform parameter processor 230 by representing the Affine transform parameters as a two-by-two matrix.

Affine Transform Frequency Analysis

Figure 9A:
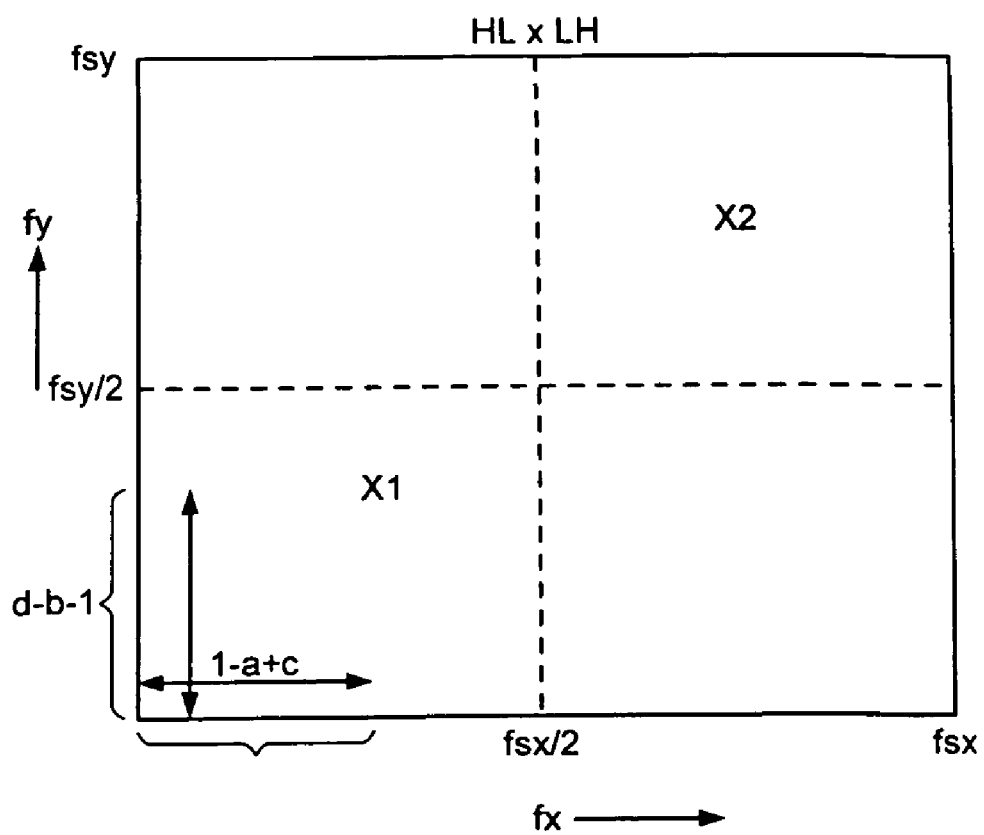
FIG. 9A is a representation of a two dimensional graphical form of horizontal and vertical frequency domain samples resulting from a frequency transform of a product of template samples from the HL×LH Wavelet bands.
Figure 9B:
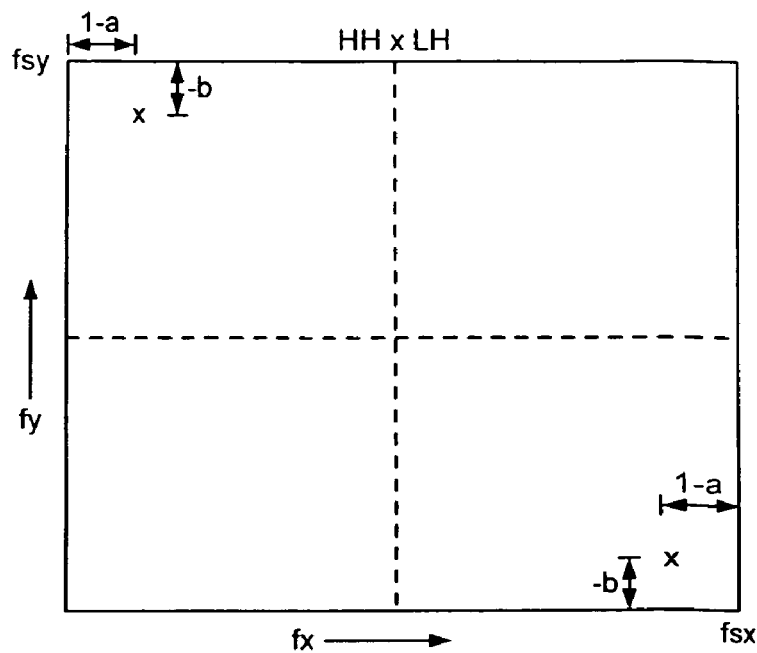
FIG. 9B is a corresponding two dimensional graphical form of horizontal and vertical frequency domain samples for the HH×LH product bands, and FIG. 9C correspondingly provides a two dimensional frequency representation for the HL×HH product bands.
Figure 9C:
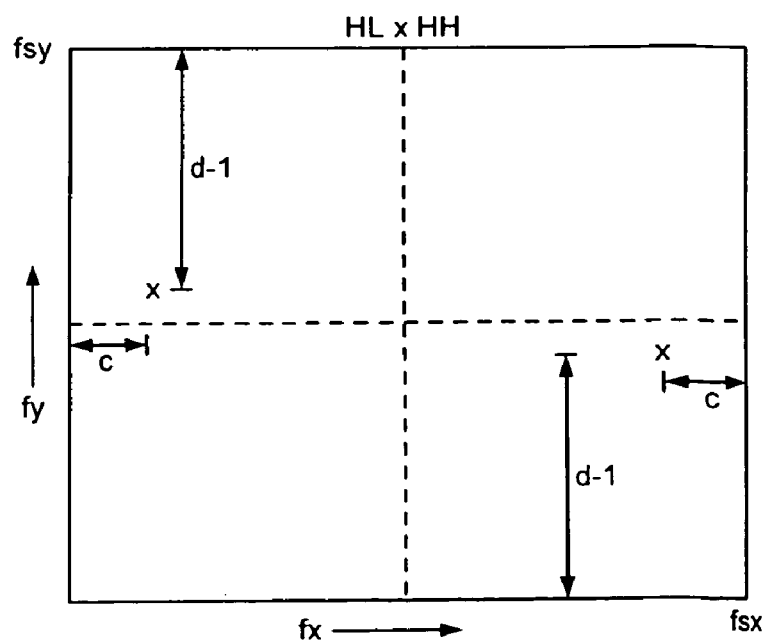

The operation of the transform parameter processor 230 which estimates the Affine transform parameters from the two dimensional frequency peak signal samples will now be explained with reference to FIGS. 9A, 9B and 9C. FIG. 9A provides a representation of the horizontal and vertical values of signal samples with the peak value marked as X1 and X2 for the two-dimensional frequency domain product samples from the $hV_1lH_1 \times lV_1hH_1$ bands (HL×LH).

It will now be explained how the Affine transform parameters are evaluated from the peak two-dimensional frequency values. A general two-dimensional Affine transform can be represented by a 2×2 matrix. Applying the transform results in the transformed coordinates, $$[u \ v]^T = M_f [x \ y]^T$$

$$M_f = \begin{vmatrix} a_f b_f \\ c_f d_f \end{vmatrix}$$

Where u and v are the pixel co-ordinates of a transformed point, and a, b and c, d are the four parameters which correspond to an Affine transform.

A translation may be included in the transform by adding an additional vector, which has the effect of shifting the pixel with respect to the origin of the original.

$$[u \ v]^T = M_f [x \ y]^T + [o_{xf} \ o_{yf}]^T$$

Where $o_{xf}, o_{yf}$ are an additional vector representing a shift of the pixel with respect to the origin. If the matrix M is non-singular, then there exists another matrix and vector that will produce the inverse transform, $$[x \ y]^T = M_i [u \ v]^T + [o_{xi} \ o_{yi}]^T$$

where $$M_i = M_f^{-1} = \begin{vmatrix} a_i b_i \\ c_i d_i \end{vmatrix}$$

$$[o_{xi}, o_{yi}] = -M^{-1}[o_{xf} o_{yf}]$$

and $a_i$, $b_i$, $c_i$, $d_i$, represent the Affine transform parameters which will invert the Affine transform representing the distortion applied to the image or pixel.

Consider the action of the above transform on the following two-dimensional cosine wave, which may be considered as one of the frequency components of the template signal:

$S(x,y)=\exp(xk_x f_x+yk_y f_y+ip)+\exp(-(xk_x f_x+yk_y f_y+ip))$, then

IF $T(u,v)=T(S(x,y))$, then $T(u,v)=\exp(uk_x(a_i f_x+c_i f_y)+vk_y(b_i f_x+d_i f_y)+i \ [\text{đ} o_x f_x/ f_{sx}+\text{đ} o_y f_y/f_{sy}+p])$ $+\exp(-(uk_x(a_i f_x+c_i f_y)+vk_y(b_i f_x+d_i f_y)+i \ [\text{đ} o_x f_x/f_{sx}+\text{đ} o_y f_y/f_{sy}+p])$ So the Affine transform maps an image cosine wave, to a cosine wave of different frequency, $\text{AFFINE}_M(f_x, f_y, p)=((a_i f_x+c_i f_y), (b_i f_x+d_i f_y), \text{đ} o_x f_x/f_{sx}+\text{đ} o_y f_y/f_{sy}+p)$ Affine Transform of a Wavelet Transformed Data Signal Consider a single frequency component of a Wavelet band, $f_x, f_y, p, \ 0 < f_x < f_{sx}/2, \ 0 < f_y < f_{sy}/2$ As mentioned above, the Affine transform parameters, which represent the distortion, applied to an image utilises a characteristic that the Affine transform alters the frequency components differently. The template signal is therefore affected differently, depending on the Wavelet bands in which the template signal is present, but noting that the difference is independent of the initial frequency in the band.

First assume that the component signal in the $lH_1 lV_1$ band, is transformed using a Discrete Wavelet Transform. This provides:

$DWT_{LL}(\text{AFFINE}_M(IDWT_{LL}(f_x, f_y, p)))$

Expanding the functions gives, $DWT_{LL}(\text{AFFINE}_M(IDWT_{LL}(f_x, f_y, p)))=((af_x+cf_y), (bf_x+df_y), \text{đ} o_x f_x/f_{sx}+\text{đ} o_y f_y/f_{sy}+p)$ Similarly for the other bands:

$DWT_{HL}(\text{AFFINE}_M(IDWT_{HL}(f_x, f_y, p)))= ((af_x+cf_y+2f_{sx}(1-a)),(bf_x+df_y+2f_{sy}(-b)),\text{đ} o_x [f_x/ f_{sx}-1]+\text{đ} o_y f_y/f_{sy}+p)$ $DWT_{LH}(\text{AFFINE}_M(IDWT_{LH}(f_x, f_y, p)))= ((af_x+cf_y+2f_{sx}(-c)),(bf_x+df_y+2f_{sy}(1-d)),\text{đ} o_x f_x/ f_{sx}+\text{đ} o_y [f_y/f_{sy}-1]+p)$ $DWT_{HH}(\text{AFFINE}_M(IDWT_{HH}(f_x, f_y, p)))= ((af_x+cf_y+ 2f_{sx}(1-a-c)),(bf_x+df_y+2f_{sy}(1-b-d)), \text{đ} o_x [f_x/f_{sx}-1]+\text{đ} o_y [f_y/f_{sy}-1]+p)$ Note that all four of the output frequencies are very similar. As such, an expression can be formed for a general Wavelet band BB. The transformed frequency component signal for the DWT is of the form:

$$DWT_{BB}(AFFINE_M(IDWT_{BB}(f_x, f_y, p))) = ((C^X + D^X_{BB}), (C^Y + D^Y_{BB}), C^P + D^P_{BB})$$

where

| | | |
|---|---|---|
| $C^X = af_x + bf_y$ | $C^Y = cf_x + df_y$ | |
| $C^P = do_x f_x/f_{sx} + do_y f_y/f_{sy} + p$ | | |
| $D^X_{LL} = 0$ | $D^Y_{LL} = 0$ | $D^P_{LL} = 0$ |
| $D^X_{HL} = 2 f_{sx} (1-a)$ | $D^Y_{HL} = 2 f_{sy} (-b)$ | $D^P_{HL} = -do_x$ |
| $D^X_{LH} = 2 f_{sx} (-c)$ | $D^Y_{LH} = 2 f_{sy} (1-d)$ | $D^P_{LH} = -do_y$ |
| $D^X_{HH} = 2 f_{sx} (1-a-c)$ | $D^Y_{HH} = 2 f_{sy} (1-b-d)$ | $D^P_{HH} = -do_x-do_y$ |

As will be appreciated from the above equations and analysis, in the Wavelet transform domain, the effect of the Affine transform can be resolved independently of the value of the frequency component signal in the two dimensional frequencies $f_x$, $f_y$.

Product of Transformed Wavelet bands

If an Affine transform is applied to the resulting image, the distorted image will have the frequencies given above in the three Wavelet domain bands.

Now consider the following products of the Wavelet bands formed by multiplying each sample of one Wavelet band with the corresponding sample of the other band, $HL \times LH = HL \times LH$ $HH \times LH = HH \times LH$ $HL \times HH = HL \times HH$ The Wavelet bands of the transformed image contain the frequencies

HL; $C^X+D^X_{HL},C^Y+D^Y_{HL},C^P$

LH; $C^X+D^X_{LH},C^Y+D^Y_{LH},C^P$

HH; $C^X+D^X_{HH},C^Y+D^Y_{HH},C^P$

Forming the products using the rule sin(A)sin(B)=sin(A+B)+sin(A−B), provides:

HL×LH; $D^X_{HL} - D^X_{LH}, D^Y_{HL} - D^Y_{LH}, D^P_{HL} - D^P_{LH}$

HH×LH; $D^X_{HH} - D^X_{LH}, D^Y_{HH} - D^Y_{LH}, D^P_{HH} - D^P_{LH}$

HL×HH; $D^X_{HL} - D^X_{HH}, D^Y_{HL} - D^Y_{HH}, D^P_{HL} - D^P_{HH}$

Expanding gives:

HL×LH; $2f_{sx}(1-a+c), 2f_{sy}(d-b-1), -\text{đ}o_x + \text{đ}o_y$

HH×LH; $2f_{sx}(1-a), 2f_{sy}(-b), -\text{đ}o_x$

HL×HH; $2f_{sx}(c), 2f_{sy}(d-1), \text{đ}o_y$

Therefore, placing the same frequency in three Wavelet bands, performing an inverse Wavelet, applying an Affine transform and/or a translation, applying a Wavelet transform and forming the above products, results in a frequency that is dependent on the applied Affine transform. The frequency component is independent of the actual frequency of the template signal, phase and shift of the image representative of the applied translation.

FIG. 9A provides an example of a pair of frequency peak values for the HL×LH band pair. As shown in FIG. 9A, the horizontal axis provides values of horizontal frequency in the Fourier transform domain from 0 to $f_{sh}$, which is the sampling frequency in the horizontal direction. The vertical axis in FIG. 9A provides values of vertical frequency in the Fourier transform domain from 0 to $f_{sv}$, which is the vertical sampling frequency. As such, a position at half the value on each axis corresponds respectively to half the value of the horizontal and vertical sampling frequencies $f_{sh}/2$, $f_{sv}/2$. Accordingly, the frequency values for both the horizontal and vertical frequency components alias either side of half the vertical and horizontal sampling frequency values. For this reason the peak value X1 is reflected about the value corresponding to half the vertical and horizontal sampling frequencies at a point X2. The pair of points X1, X2 therefore appear in the two dimensional Fourier transform domain representation of the band product pair HL×LH. Correspondingly the peak two dimensional frequency values in the other two band product pairs, shown in FIGS. 9B and 9C, will be paired with values either side of half of the value of the vertical and horizontal sampling frequencies.

As indicated in FIG. 9A, the peak values of the horizontal and vertical frequencies X1, X2 correspond to co-ordinates in the horizontal and vertical dimensions which correspond with the Affine transform parameters which have been experienced by the image. For the HL×LH band product pairs, the peak two-dimensional frequency peak value corresponds to $f_v = d-b-1$ and $f_h = 1-a+c$, according to the above equation. Correspondingly, the values of the peak horizontal and vertical frequency point in the other two band products HH×LH, HL×HH as shown in FIGS. 9B and 9C are respectively $f_v = -b$, $f_h = 1-a$ and $f_v = d-1$, $f_h = c$, according to the other equations above. Therefore with the measured values of the peak horizontal and vertical frequency point in each of the three band product pairs, the above equations can be solved to determine the values of the Affine transform parameters a, b, c, d. As will be appreciated this can be achieved in several ways. In one embodiment, the values of a, b, c, and d are varied over all possible values and for each set of values, the horizontal and vertical frequency values of the corresponding two dimensional frequency point are added for each of the three band product pairs. The set of parameter values which produce the sum with the greatest magnitude are then determined to be the Affine transform parameters representing the distortion applied to the image.

Having detected the transform parameters, the Affine transform is inverted by the inversion process 120, shown in FIG. 6, to recover the original perspective of the image. The data embedded in the image may be therefore more likely to be recovered by the de-embedding processor 130.

Further Embodiments

As will be appreciated embodiments of the present invention can be used to both detect distortion and correct for distortion experienced by a data signal. However a particular application is to provide an improved facility for recovering data, which has been embedded in material. For example, if the material is video material which has been distorted in some way, the distortion may have an effect of reducing the likelihood of correctly recovering the embedded data.

As illustrated in FIG. 1, it is known that pirate copies of films can be produced by a person recording the film using a video camera in a cinema at which the film is being shown. The effect of recording the film using a video camera can distort the recorded film in accordance with a relative perspective view of the cinema screen from the camera. The distortion can have an effect of reducing the likelihood of correctly recovering the embedded data.

As disclosed in [1] data may be embedded in material such as, for example, video material. This embedded data may be meta data, which identifies the content of the material. In another example the embedded data may be a unique or substantially unique identifier, which can be used to identify the material, providing the owner with a facility for asserting intellectual property rights in the material.

As will be appreciate in some embodiments of the invention the image may already be presented in a form in which the frequency bands can be accessed. Accordingly, embodiments of the present invention can provide a detection processor operable to identify distortion of a data signal in accordance with a relative frequency change between versions of a template signal recovered from first and second frequency bands of the data signal.

Embedding and Recovering Data

A short explanation will now be given of a process through which data may be embedded and recovered from material. Further details are provided in [1].

Generally, an example arrangement for embedding data may comprise a pseudo-random sequence generator, a modulator, a Wavelet transformer, a combiner and an inverse Wavelet transformer.

The pseudo-random sequence generator produces a Pseudo Random Bit Sequence (PRBS), which is fed to the modulator. The modulator is operable to modulate each copy of a PRBS, with each bit of payload data to be embedded. In preferred embodiments, the data is modulated by representing the values of each bit of the PRBS in bipolar form ('1' as +1, and '0' as −1) and then reversing the polarity of each bit of the PRBS, if the corresponding bit of the payload data is a '0' and not reversing the polarity if the corresponding bit is a '1'. The modulated PRBS is then embedded in the material in the transform domain. The Wavelet transformer converts the image into the Wavelet domain. The combiner embeds the payload data into the image, by adding, for each bit of the modulated PRBS a factor α scaled by ±1, in dependence upon the value of the modulated PRBS. Each coefficient of a predetermined region of the Wavelet domain image is encoded according to the following equation:

$$X'_i = X_i + \alpha_n W_n$$

Where $X_i$ is the i-th wavelet coefficient, $\alpha_n$ is the strength for the n-th PRBS and $W_n$ is the n-th bit of the payload data to be embedded in bipolar form. Therefore the image is converted from the spatial to the Wavelet transform domain, the combiner adds the PRBS modulated data to the Wavelet domain image, in accordance with application strength α and the image is then inverse Wavelet transformed.

The modulated PRBS effectively forms a spread spectrum signal representing the payload data. As a spread spectrum signal, a reduction can be made in the strength of the data to be embedded in the image. By cross-correlating the data in the transform domain image to which the modulated PRBS has been added, with a copy of the PRBS, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

Therefore, in order to recover the embedded data from the image, a Wavelet transformer converts the watermarked image into the transform domain. The Wavelet coefficients to which the PRBS modulated data were added by the combiner are then read from the Wavelet bands. These Wavelet coefficients are then correlated with respect to the corresponding PRBS, which was used to embed the data. Generally, this correlation is expressed as the equation below, where $X_n$ is the n-th wavelet coefficient and $R_n$ is the R-th bit of the PRBS generated by the pseudo random sequence generator.

$$C_n = \sum_{i=1}^{s} X_{sn+i} R_i$$

The relative sign of the result of the correlation $C_n$ then gives an indication of the value of the bit of the embed data in correspondence with the sign used to represent this bit in the embedder.

As will be appreciated, as well as embedding data in a data signal or image, the template signal may be added and detected in a corresponding way.

Various modifications may be made to the embodiments herein before described without departing from the scope of the present invention. In particular as illustrated, embodiments of the present invention may be used with a one-dimensional data bearing signal such as that represented as amplitude with respect to time as well as with two-dimensional signals such as images or other material.

REFERENCES

[1] Co-pending UK patent applications numbers 0029859.6, 0029858.8, 0029863.8, 0029865.3, 0029866.1 and 0029867.9.
[2] "Affine Transformation", www.dai.ed.ac.uk/HIPR2/affine.htm.

The invention claimed is:

1. A data processing apparatus for detecting distortion of a data signal to which a template signal has been introduced into at least first and second frequency bands of said data signal, said apparatus comprising a detection processor operable to identify said distortion of said data signal in accordance with a relative frequency change between versions of said template signal recovered from said first and said second frequency bands of said data signal.

2. A data processing apparatus as claimed in claim 1, comprising a frequency component processor operable to generate data representative of the frequency components of said first and said second frequency bands of said data signal, by transforming said data signal into a transform domain in which said frequency components of said data signal are provided.

3. A data processing apparatus as claimed in claim 2, wherein said transform is the Discrete Wavelet transform, said frequency bands being provided as Wavelet bands.

4. A data processing apparatus as claimed in claim 1, wherein said detection processor is operable to generate data representing versions of said template signal recovered from said first and said second frequency bands, to transform said template signal from said first and said second bands into the frequency domain, and to determine said relative frequency change from a comparison of the frequency domain versions of said template signal from said first and second bands.

5. A data processing apparatus as claimed in claim 1, wherein said detection processor is operable to generate data representing versions of said template signal recovered from said first and said second frequency bands, to multiply the samples of said recovered template signal from said first frequency band, with corresponding samples of said template signal from said second frequency band to produce product signal samples, to transform said product signal samples into the frequency domain, to determine said relative change in frequency from at least one sample of said frequency domain product samples having a larger magnitude than the others.

6. A data processing apparatus as claimed in claim 1, wherein said detection processor is operable to generate parameter data representative of said identified distortion.

7. A data processing apparatus as claimed in claim 2, wherein said data signal is a two dimensional signal having vertical and horizontal frequency components, said first and second frequency bands comprising different band combinations of the horizontal and vertical frequency components.

8. A data processing apparatus as claimed in claim 7, wherein said transform is the two dimensional Discrete Wavelet transform.

9. A data processing apparatus as claimed in claim 7, wherein said frequency component processor provides a plurality of bands of said two dimensional data signal, and said detection processor is operable to generate data representing versions of said template signal recovered from at least two frequency bands, to multiply the samples of said template signal from one of said bands with a corresponding sample from each of at least two other bands to produce a plurality of product samples for each corresponding sample of said recovered template signal, to form a Fourier transform for each version of said product samples, and to identify said change in frequency from said frequency domain samples of said product samples having the largest magnitude.

10. A data processing apparatus as claimed in claim 1, wherein each template signal introduced into said first and said second frequency bands is the same signal.

11. A data processing apparatus as claimed in claim 1, wherein said template signal is a Pseudo Random Noise Signal.

12. A data processing apparatus as claimed in claim 1, wherein said template signal in one of said plurality of bands is formed from a version of the data signal from another of said bands.

13. A data processing apparatus as claimed in claim 6, wherein said parameter data is representative of parameters of a transform applied to an image, which transform is representative of the distortion applied to the image.

14. A data processing apparatus as claimed in claim 13, wherein each of the parameters of said transform is determined from a relationship between values of two dimensional co-ordinates of said frequency change of said template signal according to a two dimensional frequency representation.

15. A data processing apparatus as claimed in claim 13, wherein said transform representative of said distortion is the Affine transform, said parameter data representing at least four parameters.

16. A data processing apparatus as claimed in claim 15, wherein said Affine transformation is represented as $$[u \ v]^T = M_f [x \ y]^T$$

$$M_f = \begin{vmatrix} a_f b_f \\ c_f d_f \end{vmatrix}$$

Where $a_f$, $b_f$, $c_f$, $d_f$ are the Affine transform parameters, x, y are the values of the original pixel co-ordinates and u, v are the transformed pixel co-ordinates, and for Wavelet product bands HL×LH; $f_h=1-a+c$, $f_v=d-b-1$ for Wavelet product bands HH×LH; $f_h=1-a$, $f_v=-b$ for Wavelet product bands HL×HH; $f_h=c$, $f_v=d-1$.

17. A computer readable storage medium having recorded thereon computer executable instructions, which when loaded on to a data processor configures the data processor to operate as the data processing apparatus claimed in claim 6.

18. A computer readable storage medium having recorded thereon computer executable instructions, which when loaded onto a data processor configures the data processor to operate as the data processing apparatus according to claim 1.

19. A data processing apparatus as claimed in claim 1, wherein each of the template signals introduced into said first and second frequency bands have a predetermined relationship with each other.

20. A data processing apparatus operable to correct for distortion of a data signal into which a template signal has been introduced into at least first and second frequency bands of said data signal, each of the template signals introduced into said first and second frequency bands having a predetermined relationship with each other, said apparatus comprising:

a detection processor operable to identify said distortion of said data signal in accordance with a relative frequency change between versions of said template signal recovered from said first and said second frequency bands of said data signal, wherein said detection processor is operable to generate parameter data representative of said identified distortion; and an inversion processor operable to receive said parameter data representative of said distortion according to transform of said data signal and to reverse said distortion of said data signal.

21. A data processing apparatus operable to detect data embedded in a data signal in which a template signal has been introduced into at least first and second frequency bands of said data signal, each of the template signals introduced into said first and second frequency bands having a predetermined relationship with each other, said apparatus comprising:

a detection processor operable to identify distortion of said data signal in accordance with a relative frequency change between versions of said template signal recovered from said first and said second frequency bands of said data signal, wherein said detection processor is operable to generate parameter data representative of said identified distortion;

an inversion processor operable to receive said parameter data representative of said distortion and said data signal and to reverse said distortion of the data signal; and a data detector operable to recover said embedded data from said data signal.

22. A data processing apparatus as claimed in claim 21, wherein said embedded data is identifiable by the owner of said data signal.

23. A data processing apparatus as claimed in claim 21, wherein said embedded data is a Unique Material Identifier or a part thereof.

24. A data processing apparatus as claimed in claim 21, wherein said embedded data is meta data describing the content of said data signal.

25. An image processing apparatus operable to receive image data representative of a distorted image and to reverse the distortion applied to said image, said image having template signals introduced into respective at least first and second frequency bands of said image, said image processing apparatus comprising:

a detection processor operable to identify said distortion of said image in accordance with a relative frequency change between versions of said template signal recovered from said first and said second frequency bands of said image, wherein said detection processor is operable to generate parameter data representative of said identified distortion;

wherein said parameter data is representative of parameters of a transform applied to said image, which transform is representative of the distortion applied to the image, and an inverse transform processor operable to invert the transform representative of the distortion in accordance with said parameters.

26. A computer readable storage medium having recorded thereon computer executable instructions, which when loaded onto a data processor configures the data processor to operate as an image processing apparatus according to claim 25.

27. A data processing apparatus operable to combine at least first and second template signals into first and second frequency bands respectively of a data signal, said template signals having a predetermined relationship with one another and being combined in said first and second bands with the effect that distortion of said data signal produces a relative change in frequency between said first and said second template signals.

28. A data processing apparatus as claimed in claim 27, wherein each template signal combined with said first and second frequency bands is the same signal.

29. A data processing apparatus as claimed in claim 27, wherein said template signal is a predetermined noise signal.

30. A data processing apparatus as claimed in claim 29, wherein said predetermined noise signal is generated from a Pseudo Random Bit Sequence (PRBS).

31. A data processing apparatus as claimed in claim 27, wherein said template signal is derived from the frequency component signal from one of the frequency component bands.

32. A data processing apparatus as claimed in claim 27, comprising a transform processor operable to transform said data signal into the transform domain, said transform domain providing said frequency bands to which said template signal is added.

33. A method of processing data for detecting distortion of a data signal to which a template signal has been introduced into first and second frequency bands of said data signal, each of the template signals introduced to said first and second frequency bands having a predetermined relationship with each other, said method comprising (a) generating data representative of the frequency components of a first and a second of said different frequency bands of said signal, and (b) identifying said distortion of said data signal in accordance with a relative frequency change between said versions of said recovered template signal.

34. A method of processing data as claimed in claim 33, wherein said method comprises the step of (c) transforming the data signal into a transform domain in which said frequency components of said data signal are provided.

35. A method of processing data as claimed in claim 33, wherein said transform is the discrete Wavelet transform, said frequency bands being provided as Wavelet bands.

36. A method of processing data as claimed in claim 33, wherein (b) said identifying the relative frequency change is determined by (b.i) generating data representing versions of said template signal recovered from said first and said second frequency bands, (b.ii) multiplying the samples of said recovered template signal from said first frequency band, with corresponding samples of said template signal from said second frequency band to produce product signal samples, (b.iii) transforming said product signal samples into the frequency domain, and (b.iv) determining said relative change in frequency from at least one sample of said frequency domain product samples having a larger magnitude.

37. A method of processing data as claimed in claim 33, wherein said detection processor is operable to generate data representative of said identified distortion.

* * * * *